United States Patent [19]
Moe et al.

[11] Patent Number: 5,367,566
[45] Date of Patent: Nov. 22, 1994

[54] COMMON CHANNEL SIGNALING MESSAGE INTERCEPT SYSTEM

[75] Inventors: Warren R. Moe; Larry A. Russell; Teresa L. Russell, all of Atlantic Highlands; Catherine A. Schevon, Madison, all of N.J.; Roger E. Stone, Naperville, Ill.

[73] Assignee: AT&T Corp., Murray Hill, N.J.

[21] Appl. No.: 813,708

[22] Filed: Dec. 27, 1991

[51] Int. Cl.$^5$ .................. H04M 3/00; H04M 1/64; H04M 15/00; H04M 3/42

[52] U.S. Cl. .................. 379/243; 379/88; 379/127; 379/207; 379/211; 379/220; 379/230

[58] Field of Search .............. 379/127, 201, 207, 213, 379/220, 222, 230, 243, 244, 67, 88, 210, 211

[56] References Cited

U.S. PATENT DOCUMENTS

| | | | |
|---|---|---|---|
| 4,555,594 | 11/1985 | Friedes et al. | 379/207 X |
| 4,683,563 | 7/1987 | Rouse et al. | 370/16 |
| 4,752,924 | 6/1988 | Darnell et al. | 370/86 |
| 4,757,267 | 7/1988 | Riskin | 379/201 X |
| 4,769,834 | 9/1988 | Billinger et al. | 379/221 X |
| 4,782,519 | 11/1988 | Patel et al. | 379/211 |
| 5,136,636 | 8/1992 | Wegrzynowicz | 379/127 X |
| 5,255,315 | 10/1993 | Bushnell | 379/230 X |

OTHER PUBLICATIONS

New Communication Services . . . ; "The Number 2 Signal Transfer Point: An Overview of the AT&T Common Channel Signaling Packet Switch", D. M. Rouse, et al, pp. 370–374.

*Primary Examiner*—James L. Dwyer
*Assistant Examiner*—Harry S. Hong
*Attorney, Agent, or Firm*—Frederick B. Luludis

[57] ABSTRACT

To facilitate the processing of an incoming telephone call associated with a respective telecommunications network service an initial address message identifying the incoming call is intercepted before the message is presented to an associated toll switch that will process the call. The intercepted message is then examined in order to identify the toll switch service logic that will process the call. The resulting identity is then appended to the message and that result is then passed to the toll switch so that the identified service logic may be invoked to process the call in accord with the requested service.

20 Claims, 6 Drawing Sheets

FIG. 5

NPA TABLE — 500

| Index | Value |
|---|---|
| 000 | NULL |
| ... | ... |
| 201 | 201 TABLE ADDRESS |
| ... | ... |
| 302 | 302 TABLE ADDRESS |
| ... | ... |
| 908 | NULL |
| 999 | |

FIG. 6

201 TABLE — 601

| Index | Value |
|---|---|
| 000 | NULL |
| ... | ... |
| 555 | 201-555 TABLE ADDRESS |
| ... | ... |
| 901 | 201-901 TABLE ADDRESS |
| ... | ... |
| 999 | NULL |

302 TABLE — 602

| Index | Value |
|---|---|
| 000 | NULL |
| ... | ... |
| 555 | 302-555 TABLE ADDRESS |
| ... | ... |
| 999 | |

COMMON CHANNEL SIGNALING MESSAGE INTERCEPT SYSTEM

FIELD OF THE INVENTION

The invention relates to telephone networks, and more particularly relates to identifying and executing call processing logic that is associated with a particular service request.

BACKGROUND OF THE INVENTION

In the prior art, several approaches have been used in an interexchange network to identify the service logic that needs to be executed to process a particular service request. One prior approach connects telephone user equipment subscribing to a particular service directly to a dedicated interexchange trunk group so that the interexchange network can identify the requested service and thus the service logic that needs to be executed to process an associated service call. However, such an approach is not economical, since most service subscribers do not provide a sufficient level of traffic (or demand) to use optimally the capacity of a dedicated trunk group.

Another prior approach attempts to optimize trunk usage by associating a trunk group, and thus the service logic, with a combination (set) of network services. Although such optimization is somewhat economical, it is not flexible. That is, in order to obtain a desired service a telephone user has to subscribe to a combination of such services, some of which the telephone user might find to be undesirable.

As is well-known, a variety of signaling protocols are used to establish connections between switching exchanges (i.e., local and toll offices). One such protocol is the well-known Signaling System 7 (SS7). The SS7 protocol has been defined by Study Group XI - Specification of Signaling System No. 7, International Telegraph and Telephone Consultative Committee (CCITT) Blue Book, Vol. 6 of Facile VI.9, Geneva, Switzerland, 1989. The SS7 protocol provides, inter alia, a method by which a local exchange office transmits a code known as Automatic Number Identification (ANI) to a toll office, in which the ANI identifies the originator (i.e., line circuit) of a call that the former office is forwarding to the latter office. The ANI code, as well as the called telephone number, are transmitted in a signaling message or packet commonly referred to as an Initial Address Message (IAM), which contains other information necessary for the toll switch to complete the call. Since an IAM contains ANI information identifying the source of a telephone call, it appears that a specific network service associated with a telephone call could be identified at a toll switch by merely examining the ANI information contained in the associated SS7 message.

However, such an approach is not always practical. The reason for this is that a toll switch would have to check the ANI information accompanying each incoming call to determine if the call is associated with a particular service and/or feature. Since a toll switch processes a very large number of incoming calls, the additional task of checking the ANI information associated with each incoming call would increase the load on the call processing resources of the toll switch.

SUMMARY OF THE INVENTION

An advancement in the art of call processing is achieved by providing in a telecommunications network a facility which, in accord with the invention, appends to an IAM message associated with an incoming call the identity of the service logic that will process the call and then presents the revised message to an associated toll switch. In particular, the inventive facility operates to intercept such an IAM message before it is presented to the associated toll switch. The facility then translates the ANI information contained in the message into the identity of the service logic that will process the call. The facility then appends the identity to the message and passes the result to the associated toll switch.

BRIEF DESCRIPTION OF THE DRAWING

In the Drawing:

FIGS. 5-7 are illustrative examples of various translation tables arranged to translate ANI information accompanying an incoming call into a service identity.

DETAILED DESCRIPTION

Figure 1:
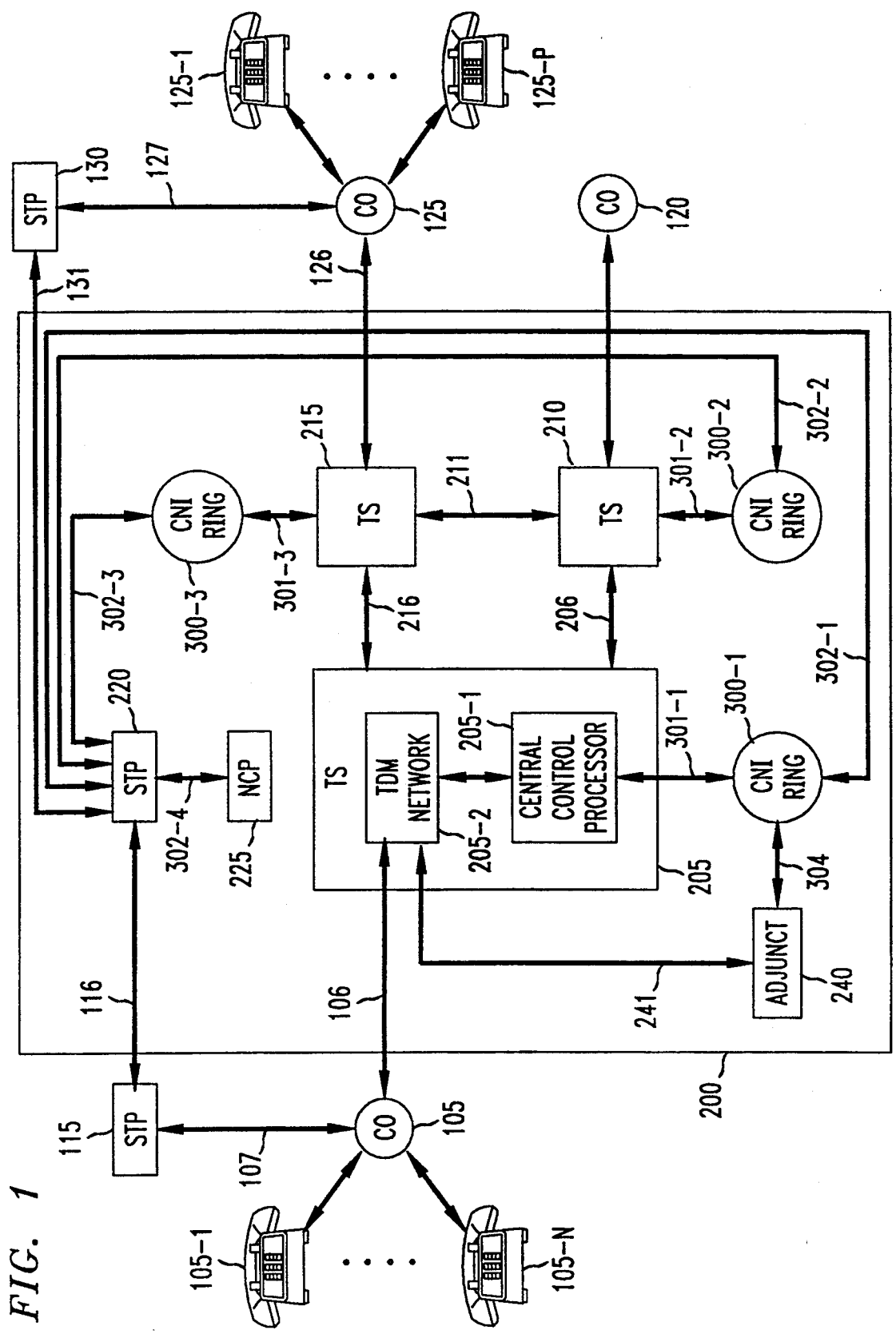
FIG. 1 shows a broad block diagram of a telecommunications network in which the principles of the invention may be practiced.

In an exemplary embodiment of the invention, communications network 200 shown in FIG. 1 may be an interexchange network, such as, for example, the well-known AT&T public switched network that provides a plurality of services for its subscribers, such as the subscribers associated with station sets 105-1 through 105-N and 125-1 through 125-P. More specifically, Network 200 includes, inter alia, a plurality of interconnected Toll Switches (TS), three of which are shown in the FIG., namely, TS 205, 210 and 215. Such toll switches (e.g., 205, 210 and 215) may be any one of the well-known type of switching equipment, such as, for example, the No. 4ESS (Electronic Switching System) that is available from AT&T. In a typical case, a toll switch serves a number of local central (switching) offices (CO), three of which are shown in the FIG., namely COs 105, 120 and 125. As is well-known, a CO, e.g., CO 105 or CO 125, is arranged to connect a calling station (originator) that has dialed a particular telephone number to an associated toll switch, e.g., TS 105. A CO is also arranged to advance a telephone call received from an associated toll switch to an intended telephone station set.

Network 200 also includes so-called Common Channel Signaling (CCS) links 302-1 through 302-3 which implement the aforementioned SS7 signaling network (hereinafter CCS7 links). CCS7 links 302-1 through 302-3 respectively connect to toll switches 105, 110 and 120 via respective CNI ring packet switches 300-1 through 300-3. In an implementation of the invention, each of the CNI rings 300-1 through 300-3 may be of the type disclosed in U.S. Pat. No. 4,554,659 issued Nov. 19, 1985 to M. L. Blood et al, and U.S. Pat. No. 4,683,563 issued Jul. 28, 1987, to D. M. Rouse et al, which are hereby incorporated by reference. A CNI ring is the means by which a toll switch, e.g., TS 205, connects via respective ring nodes to a network 200 Signal Transfer Points (STP), one of which is shown in the FIG., namely STP 220. An STP, e.g., STP 220, may be, for example, the model 2STP that is available from AT&T. As is well-known, an STP operates to route messages between toll switches, between a toll switch and a CO, and between a toll switch and a network 200 data base, such as Network Control Point (NCP) 225.

It is seen from the FIG. that, in broad terms, a toll switch, e.g., TS 205, comprises, inter alia, a central control processor 205-1 and a Time Division Multiplexed (TDM) network 205-2. TDM network 205-2, operates under the control of processor 205-1, and connects to a CO, e.g., CO 105, via respective communications paths, e.g., path 106. TDM network 205-2 may also connect to an associated adjunct 240 via communications path 241. Adjunct 240, which may be, for example, the Conversant ® (registered trademark of AT&T) voice information system available from AT&T, communicates with central control processor 205-1 via path 304, CNI ring 300-1 and path 301-1. In a conventional manner, adjunct 240 may also communicate with other toll switches, e.g., TS 210 and TS 215, via path 304, CNI ring 300-1, CCS7 link 302-1 and STP 220 for the purpose of completing a telephone call.

Figure 2:
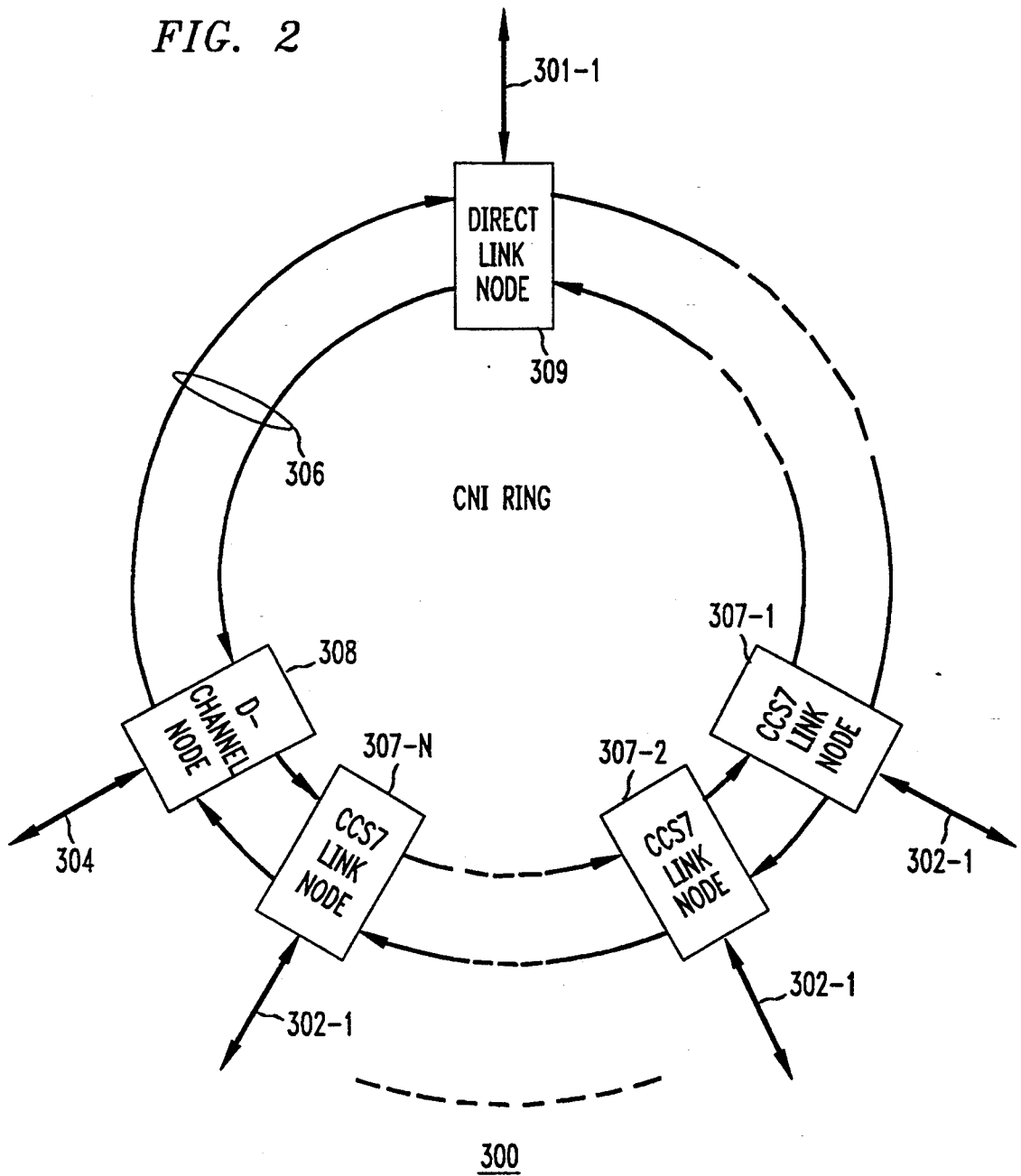
FIG. 2 is a broad block diagram of a CNI ring of FIG. 1.

Referring now to FIG. 2, there is shown a broad block diagram of CNI ring 300 comprising so-called oppositely directed transmission paths 306 forming what is commonly referred to as a token ring. Token ring 306 operates under the control of a so-called executive node (not shown). CNI ring 300 also comprises a plurality of CCS7 link nodes 307-1 through 307-N, D-channel node 308 and direct link node 309 interconnected to one another via token ring 306. Nodes 307-1 through 307-N, in turn, respectively connect to CCS7 links 302 thereby providing a multiple link interface between CNI ring 300 and a particular network 200 STP, such as STP 220. In this way, central control processor 205-1 (FIG. 1 ) may exchange CCS7 messages, for example, an IAM message, with CO or other toll switches via path 301-1, direct link node 309, token ring 306 and one of the CCS7 links 302 forming multiple CCS7 link 302-1.

That is, processor 205-1 may send a CCS7 message to a particular STP, e.g., STP 220, for delivery to another network 200 toll switch or data base (i.e., NCP 225) by supplying the message to direct link node 309 via path 301-1. Direct link node 309, in turn, transmits the message over the up-stream leg of token ring 306 for delivery to a particular one of the nodes 307-1 through 307-N which is identified in the message. The link node, in turn, transmits the message over its respective one of the multiple links 302 forming multiple CCS7 link 302-1. Similarly, a link node, e.g., node 307-1, which receives a CCS7 message via its respective CCS7 link 302 outputs the message to the down-stream leg of token ring 306 for transmission to direct link node 309. Direct link node 309, in turn, removes the message from token ring 306 and supplies it to central control processor 205-1 via communications path 301-1.

Figure 3:
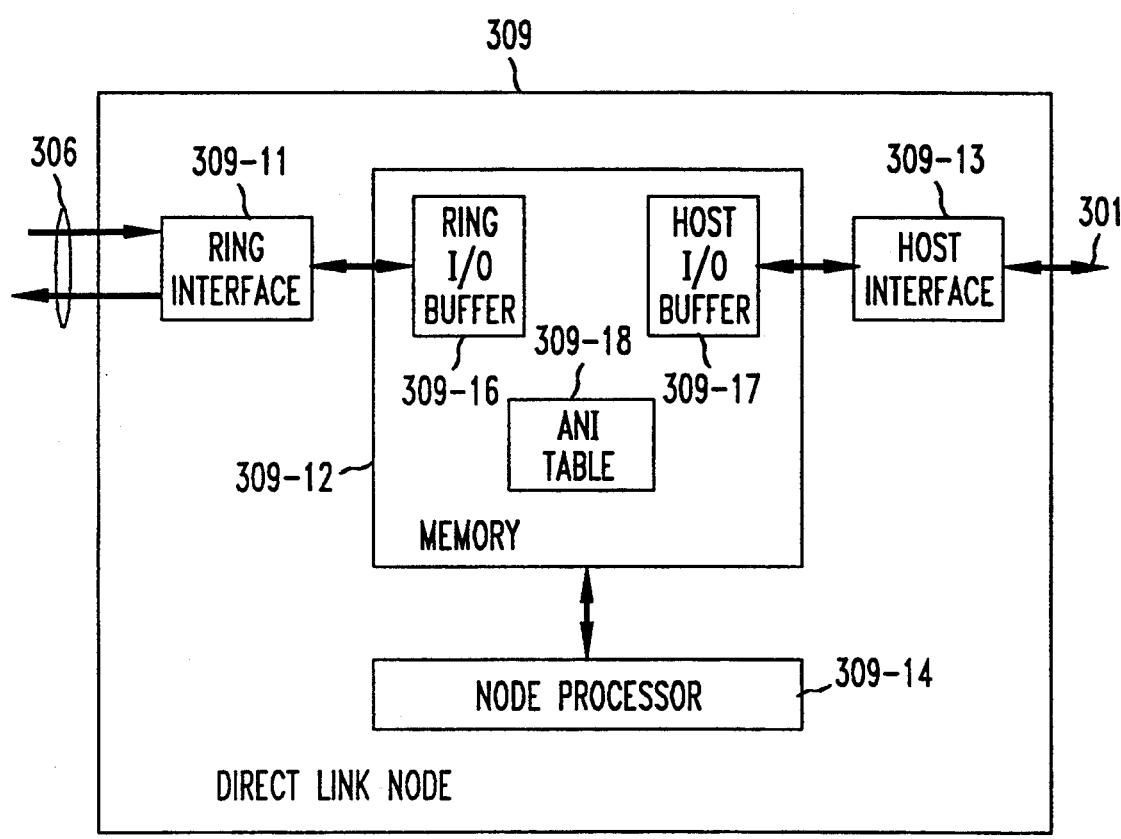
FIG. 3 is a broad block diagram of a direct link node of FIG. 2.

Turning now to FIG. 3, there is shown a broad block diagram of direct link node 309. Node 309, which is of the type disclosed in the aforementioned U.S. Pat. No. 4,752,924, includes ring interface circuit 309-11 which presents an interface to token ring 306, and host interface 309-13 which presents an interface to an associated toll switch central processor, e.g., processor 205-1, by way of a dual channel communications path 301. Node 309 also includes memory 309-12, which is partitioned into, inter alia, two I/O buffers 309-16 and 309-17. Memory, 309-12 is also partitioned to provide, in accord with an aspect of the invention, ANI Table 309-18, as will be discussed below. I/O buffers 309-16 and 309-17 operate as conventional First In, First Out (FIFO) memory arrangements. The overall operation of node 309 is under the control of node processor 309-14.

In particular, upon receiving a CCS7 message via the up-stream leg of token ting 306, ring interface 309-11 checks the message to determine if it contains an identifier identifying its associated central control processor, e.g., processor 205-1. If that is not the case, then interface 309-11 outputs the message to the succeeding up-stream leg of token ring 306. If that is case, then interface 309-11 stores the message in buffer 309-16. Node processor 309-14 periodically unloads a CCS7 message from buffer 309-16, converts the format of the message to a format expected by the associated central control processor and then stores the revised message in buffer 309-17. Host interface 309-13 then unloads the message from buffer 309-17 and supplies it to its associated host, e.g., central control processor 205-1, via communications path 301. Similarly, host interface 309-13 stores messages that it receives from its associated host via path 301 in buffer 309-17. Node processor 309-14, in turn, unloads those messages from buffer 309-17, reformats them to conform with the SS7 protocol and then stores them in buffer 309-16. Interface 309-11 then unloads the latter messages, one at a time, and transmits them over the down-stream leg of token 306 for delivery to one of the link nodes 307-1 through 307-N.

(It is noted that D-channel node 308 of FIG. 2 operates in a similar manner. That is, node 308 is the means by which adjunct 240 (FIG. 1) exchanges messages with its associated central control processor 205-1, in which the messages are formatted in accord with the Q.931 protocol. Accordingly, D-link node 309 is further arranged so that it converts a Q.931 message that it receives via ring 306 into a format expected by processor 205-1. Similarly, node 309 converts processor 205-1 messages addressed to adjunct 240 into the Q.931 format before such messages are outputted to ring 306 for delivery to node 308.)

More specifically, node 309 is arranged, in accord with an aspect of the invention, to intercept each IAM message before it is delivered to the associated central control processor and determine whether the call identified by the intercepted message is associated with a particular network 200 service or feature. If node 309 determines that is case, then node 309 identifies, in accord with an aspect of the invention, the associated service and/or feature module that will process the call and appends that identity to the IAM message before it is delivered to the associated central control processor, e.g., processor 205-1.

Figure 4:
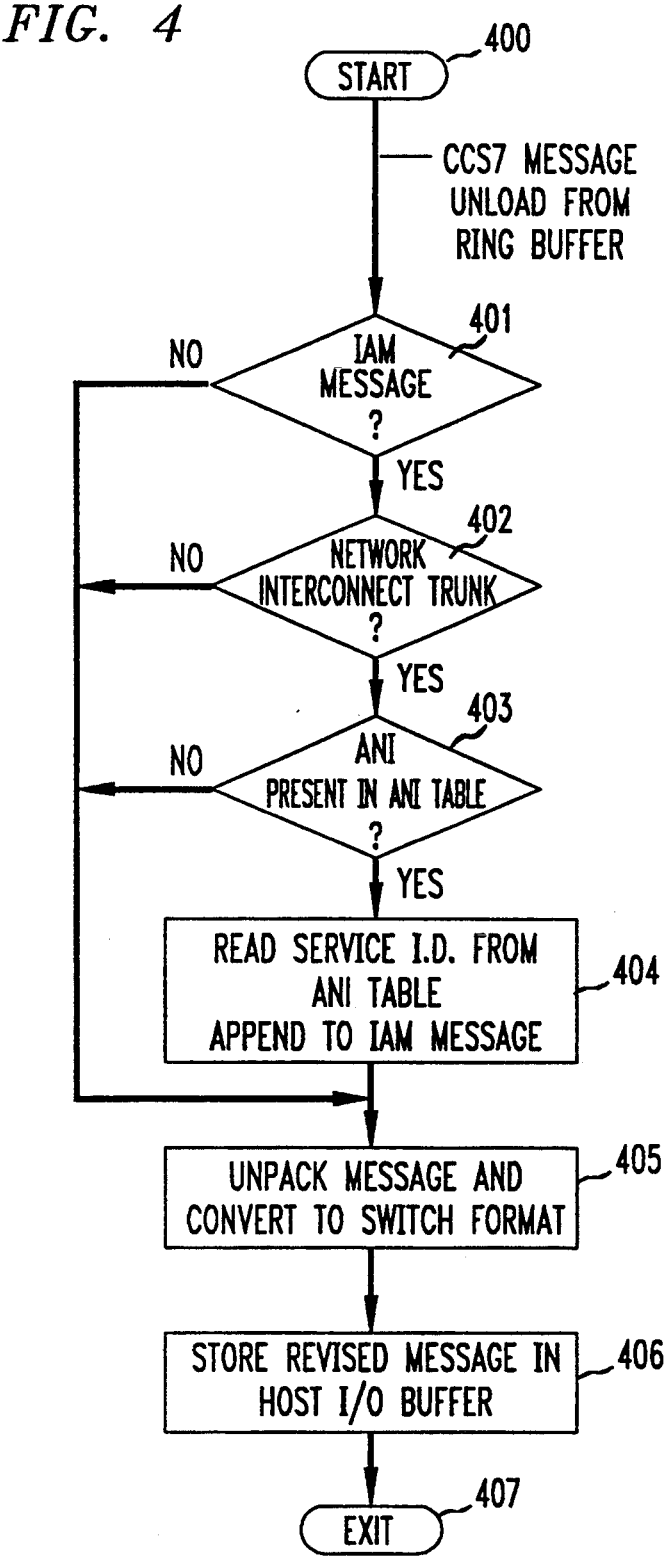
FIG. 4 illustrates in flow chart form a program which implements the invention in the direct link node of FIG. 3.

In particular, when the program controlling the operation of node processor 309-14 unloads a message from ring buffer 309-11 the program then enters the program module shown in FIG. 4. Entry of the program at block 400 causes the program to proceed to block 401 where it determines whether or not the unloaded CCS7 message is an IAM message. If the CCS7 message is not an IAM message, then the program proceeds to block 405. Otherwise, the program proceeds to block 402 where it determines if the IAM message identifies an incoming call from an associated CO, e.g., CO 105 (FIG. 1). If that is not the case, i.e., the call is from another network 200 toll switch, then the program proceeds to block 405. Otherwise, the program proceeds to block 403. At block 403, the program determines whether the ANI (e.g., telephone number of calling telephone party or, in particular instances, the dialed telephone number) specified in the IAM message is contained in ANI table 309-18. If it is not, then the program concludes that the call (i.e., calling party) is not associated with a particular network 200 service or feature and proceeds to block 405. If the ANI information is contained in table 309-18, then the program proceeds to block 404 where it translates the ANI information into a service identity code identifying the particular service and/or feature logic that will process the call. The program then appends the identity code to the IAM message and proceeds to block 405.

At block 405, the program revises the format of the CCS7 message so that the message may be processed by the associated central control processor, as mentioned above. The program then proceeds to block 406 where it stores the reformatted message in host buffer 309-17 and then exits via block 407.

Figure 7:
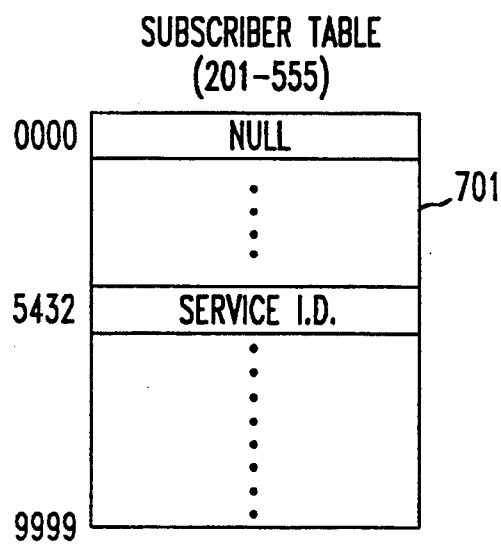

FIG. 5 through 7 illustrate the manner in which the program at blocks 403 and 404 determines if the ANI information is contained in ANI table 309-19. It also illustrates how such information may be translated into a service identity code.

In particular, ANI table 309-18 (FIG. 3) is composed of a number of tables, the first of which is indexed using the first three digits of the ANI information contained in the IAM message that the program is processing. As is well-known, ANI information may be, for example, what is commonly referred to as long distance telephone number of the form NPA-NXX-XXXX. NPA conforms with the North American dialing plan and comprises three digits, for example, 201. NXX identifies a local exchange (e.g., CO 105) and also comprise three digits, e.g., 555. XXXX identifies a line circuit connected to a subscriber telephone line associated with the local exchange and comprises four digits (e.g., 5432).

Block 403 of FIG. 4 first accesses table 500 comprising—illustratively a thousand locations—using as an index the three digit NPA code contained in the intercepted IAM message. If the accessed location contains a null word (e.g., all zeroes), then the program proceeds to block 405. If, on the other hand, the accessed location contains an address indicative of a valid NPA that is served by the associated toll switch, then the program proceeds to block 404, as mentioned above. Block 404 then proceeds to access one of the tables of FIG. 6. It is noted that, in a typical case, the majority of entries in table 500 would be null words, since a toll switch serves a relatively few NPAs.

For example, assume that the instant ANI is 201-555-5432, in which NPA 201 is served by the associated toll switch, e.g., TS 205 (FIG. 1). Block 403 then accesses table 500 using 201 as an index, meaning that the program unloads the contents of location 201 of table 500. If that location contains a null word, then, as mentioned, the program proceeds to block 405. However, assume that location 201 contains an address, which points the program to one of the tables of FIG. 6, namely table 201 associated with area code (NPA) 201.

Each of the tables of FIG. 6 comprises a number of locations e.g., 1000 locations, in which the address of each such location is associated with a respective local exchange number (NXX) that is served by the associated toll switch. As such, the number of valid entries (entries which do not contain a null word) in each of the tables of FIG. 6 is commensurate with the number of local exchanges that are served by the associated toll switch for that NPA.

Continuing, at this point, the program accesses table 201 using as an index the NXX (i.e., 555) contained in the ANI of the intercepted IAM message. It is seen from FIG. 6, that location 555 of table 601 contains an address of a next table, i.e., table 601-555, rather than a null word. In an illustrative embodiment of the invention, an address contained in one of the tables of FIG. 6, e.g., table 201, in turn, "points" to one of a number of subscriber tables. FIG. 7 illustrates one such table, whose address is stored in location 555 of table 201. Each such subscriber table comprises a number of locations, e.g., 10,000 locations, each of which is associated with a particular subscriber served by the associated toll switch. If the particular subscriber has subscribed to one or more services and/or features provided by network 200 (FIG. 1), then an associated location in one of the subscriber tables identifies that subscription.

In particular, having identified the appropriate subscriber table, e.g., table 701 (also identified as table 201-555), the program then accesses that table. In doing so, the program uses as an index the last four digits forming the ANI information (value) contained in the intercepted IAM message. As mentioned above, those four digits are assumed to be 5432. It is seen from the FIG. that location 5432 of table 701 contains a service identity (I.D. in the FIG.) record that is associated with the ANI value contained in the intercepted IAM message. In accord with an aspect of the invention, a service identity record identifies the toll switch logic module that will process the associated call. Accordingly, the program unloads a copy of the service identity record from location 5432 and appends it to the IAM message. The program then proceeds to block 405.

In accord with a another aspect of the invention, a service identity record may contain a value identifying what is commonly referred to as "plain old telephone service".

Figure 8:
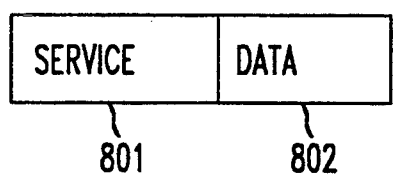
FIG. 8 is an illustrative example of a service record that is contained in the table of FIG. 7.

FIG. 8 shows an illustrative example of a service identity record 801 that is stored in an associated subscriber table, such as table 701. It is seen from the FIG. that subscriber record 801 comprises a number of fields, including a service field 801 identifying the associated subscriber's subscription of a network 200 service and/or feature, if any. As such, field 801 identifies the service module that needs to be invoked to process telephone calls originated by the associated subscriber. Field 802 contains associated data that is used to implement the service. For example, such data may identify a particular service adjunct, e.g., adjunct 240, as will be explained below.

With the foregoing in mind we now discuss a number of illustrative examples showing how the inventive feature intercepts an IAM message, and then identifies the service logic module that will be invoked to process the associated incoming call.

More specifically and referring to FIGS. 1-3, assume that a user associated with station 105-1 desires to place a telephone call and that the user has subscribed to a particular network 200 service and/or feature. To place such a call, the user signals CO 105 by first placing station 105-1 in a so-called off-hook state. The user (subscriber) then dials via the associated station keypad the telephone number identifying a particular called station, e.g., station 125-1. CO 105 in response thereto collects the dialed digits in the order that that they are received. Upon receipt of the last of the dialed digits, CO 105 analyzes the digits in conjunction with conventional translation tables stored in its internal memory to determine if the call is to be routed via TS 205 of network 200. To route the call to TS 205, CO 105 seizes an available trunk of communications path 106 connecting to TS 205. CO 105 then establishes an internal connection between an input port of the seized trunk and the communications path extending to station 105-1. CO 105 then forms an IAM message containing, inter alia, (a) the dialed digits, (b) the telephone number assigned to station 105 (i.e., ANI), (c) an origination code identifying CO 105, (d) a destination code identifying TS 205, and (e) identity of the seized trunk. CO 105 then sends the IAM message to TS 205 via CCS7 link 107 and associated STP 115. STP 115, in response to receipt of the message and based on the destination code contained therein, forwards the IAM message to STP 220 via CCS7 link 116.

For a similar reason, STP 220 forwards the message to TS 205 via CCS7 link 302-1. One of the link nodes 307-1 through 307-N accepts and then outputs the IAM message to the up-stream leg of token ring 306 for delivery to direct link node 309. Ring interface 309-11, in the manner discussed above, accepts and stores the received IAM message in buffer 309-16. Thereafter, node processor 309-14 removes the message from buffer 309-16 and then invokes the program of FIG. 4. As a result of processing the IAM message, the program appends to the message the contents of the associated subscriber record identifying the TS 205 service (program) module that Will process the call. The program then stores the revised IAM message in buffer 309-17 for delivery to central control processor 205-1 via host interface 309-13 5 and path 301-1.

Processor 205-1 responsive to receipt of the IAM message removes the appended subscriber record and invokes the service module identified therein. Assume, that the identified service is a service which queries the calling subscriber for entry of an authorization code, and then compares the entered code with a code contained in the data field of the associated subscriber record. If the comparison is found to be true, then the service module directs the associated toll switch to complete the call to the called station. If the comparison is not true, then the service module directs the switch (TS 205) to terminate the call. In an illustrative embodiment of the invention, such a service module resides in one or more of a number of adjuncts identified in the data field of the associated subscriber record, for example, adjunct 240.

Accordingly, TS 205 reformats a copy of the IAM message into the Q.931 message format and supplies the result to adjunct 240 via ring 300-i. In addition, TS 205 establishes a connection between the incoming call and adjunct 240 via associated TDM network 205-2 and path 241. Adjunct 240 responsive to receipt of the message, transmits a recorded announcement over path 241 for delivery to station set 105-1. The recorded announcement requests that the subscriber enter via the station keypad a predetermined authorization code originally specified by the subscriber. Adjunct 240, in turn, collects the digits forming the code as they are entered by the station set 105 subscriber (or caller). Upon receipt of the last of such digits, adjunct 240 compares the string of digits entered by the subscriber with the code contained in the data field of associated subscriber record. As mentioned above, if adjunct 240 finds that the string compares with the authorization code, then adjunct 240 transmits a request to complete the call to central control processor 205-1 via CNI ring 300-1. Otherwise, the request directs processor 205-1 to terminate the call. Processor 205-1, in turn and in a conventional manner, either completes or terminates the call based on the contents of the adjunct 240 request.

As another example, network 200 provides a service commonly referred to as a Software Defined Network (SDN). SDN allows a multilocation subscriber to configure a private network within network 200. Such a network is typically identified by a so-called private network identifier and each location thereof is identified by an associated private network telephone number as well as a conventional public telephone number. A private network number usually comprises seven digits. A call from one location of a private network is processed by translating the private network identifier and called private network number into its associated public telephone number. Such translation is usually done by one of the network 200 NCPs, e.g., NCP 225. The call is then routed based on the public telephone number.

Priorly, network 200 identified a particular SDN customer location by connecting that customer's communications lines to particular trunk group. As mentioned above, such a trunking arrangement is not efficient. A better approach is to allow each of such communication lines to connect to any one of the many trunk groups associated with a toll switch. Such an approach is achievable, in accord with the invention. Specifically, assume that station 105-1 is associated with such an SDN private network. In that case then, field 801 of the associated subscriber record identified by the ANI associated with station 105-1 would contain a code associating the call with the SDN service. In addition, field 802 of that record would contain the identity of the NCP, e.g., NCP 225, that will translate the called private telephone number into a public telephone number.

Accordingly, processor 205-1 responsive to receipt of the IAM identifying the SDN service invokes the call processing logic module that is designed to process an SDN call. The logic module, in turn, sends a query containing, inter alia, the private network called number to the NCP identified in the appended information. Assuming that the identified NCP happens to be NCP 225, then, upon receipt of the query, NCP 225 translates the private network called number into its associated public telephone number. NCP 225 then transmits a response message containing the results of the translation to TS 205 via STP 220 and CCS7 link 302-1. Upon receipt of the response message, processor 205-1 then routes the call based on the public telephone number identifying the called station, e.g., station 125-1 served by CO 125.

In most instances, a particular network service is identified, in the manner discussed above, using the telephone number of the calling telephone station (subscriber). It can be appreciated that in certain instances the called telephone number (dialed digits) may be used to identify the requested service. In that instance, then, direct link node 809 would translate the dialed telephone number, rather than the calling telephone number, into a code identifying the associated network service and, thus, the associated service logic.

The foregoing is merely illustrative of the principles of the invention. Those skilled in the art will be able to devise numerous arrangements, which, although not explicitly shown or described herein, nevertheless embody those principles that are within the spirit and scope of the invention. For example, the claimed invention may be used to intercept IAM messages associated with other types of services and identify the logic modules that need to be invoked to process those other services. For example, the claimed invention may be used in conjunction with a feature referred to as class of service routing, in which routing priority is based on the class service associated with a particular calling station, as disclosed in copending U.S. patent application of Ser. No. 07/770,396 filed Oct. 3, 1991, in behalf of G. R. Ash et al. As disclosed in that patent application, the trunk group over which an incoming call is received at a toll switch is used to identify a service identity value and a so-called transport capability. Here again, efficient use of a trunk group may be achieved in accord with the invention by intercepting the IAM message associated with an incoming call and identifying the associated service identity value and transport capability in accord with the invention.

We claim:

1. A telecommunications network formed from a plurality of switches interconnected to one another for forwarding incoming calls to respective destinations, said incoming calls being associated with respective calling services provided by said network, said network comprising
    means for interfacing an associated one of said switches with a data network, said switches using said data network to exchange messages with one another to forward said incoming calls to their respective destinations, said means for interfacing including
    means for intercepting a message sent to said one of said switches via said data network and containing information associated with an incoming call forwarded to said one of said switches, and further including
    means for identifying a service associated with said incoming call as a function of said intercepted information, for appending to said intercepted message an identifier identifying a service logic that is to process said call and for then passing said message to said associated switch so that said call may be processed in accord with the identified service logic.

2. The network set forth in claim 1 wherein said intercepted message is an initial address message.

3. A telecommunications network formed from a plurality of switches interconnected to one another for forwarding incoming calls to respective destinations, said incoming calls being associated with respective calling services provided by said network, said network comprising
    means for interfacing an associated one of said switches with a data network, said switches using said data network to exchange messages with one another to forward said incoming calls to their respective destinations, said means for interfacing including
    means for intercepting a message sent to said one of said switches via said data network and containing information associated with an incoming call forwarded to said one of said switches, and further including
    means for identifying a service associated with said incoming call as a function of said intercepted information, for appending to said intercepted message an identifier identifying a service logic that is to process said call and for then passing said message to said associated switch so that said call may be processed in accord with the identified service logic, wherein said calling information is a telephone number associated with an originator of said incoming call, and wherein said means for identifying includes means for translating said telephone number into a memory location having stored therein a record identifying said service logic.

4. The network set forth in claim 3 wherein said one associated switch supplies said message to an associated adjunct processor so that said incoming call may be processed in accord with said identified service logic, said adjunct processor including voice interactive means for transmitting to the originator of said incoming call a verbal message requesting entry of an authorization code, for receiving an entered code and for allowing said incoming call to be completed if the entered code compares with a code contained in said record.

5. A telecommunications network formed from a plurality of switches interconnected to one another for forwarding incoming calls to respective destinations, said incoming calls being associated with respective calling services provided by said network, said network comprising
    means for interfacing an associated one of said switches with a data network, said switches using said data network to exchange messages with one another to forward said incoming calls to their respective destinations, said means for interfacing including
    means for intercepting a message sent to said one of said switches via said data network and containing information associated with an incoming call forwarded to said one of said switches, and further including
    means for identifying a service associated with said incoming call as a function of said intercepted information, for appending to said intercepted message an identifier identifying a service logic that is to process said call and for then passing said message to said associated switch so that said call may be processed in accord with the identified service logic, wherein said calling information includes an automatic identification code identifying the source of said incoming call, said identification code including an area code, exchange code and a circuit code, and wherein said means for identifying includes means for translating said area, exchange and circuit codes into a memory location having stored therein said identity of said service logic.

6. The network set forth in claim 5 wherein said means for identifying includes means, operative in the event that said memory location does not contain the identity of said service logic, for then supplying a null word to said one of said switches as the identity of said service logic.

7. A network comprising a plurality of interconnected switches for establishing connections between individual ones of said switches to forward respective incoming calls to their intended destinations, said switches exchanging messages with one another via a communications path in order to establish said connections, said incoming calls being associated with respective services, said network comprising means for interfacing associated ones of said switches with said communications path, and wherein said means for interfacing includes, means for receiving messages via said communications path and then supplying said messages to an associated one of said switches, and further includes means, operative whenever one of said received messages is associated with an incoming call that is received at the associated one of said switches, for identifying, as a function of calling information contained in said message, a service logic that will be used to process said incoming call, for appending the identity of said service logic to said one message and supplying said one message to the associated on of said switches.

8. The network set forth in claim 7 wherein said one message is an initial address message.

9. The network set forth in claim 7 wherein said calling information is a telephone number, and wherein said means for identifying includes means for translating said telephone number into a memory location at which is stored a record identifying said service logic.

10. The network set forth in claim 9 wherein said associated one of said switches supplies said message to an adjunct processor to process said call in accord with said identified service logic, and wherein said adjunct processor including voice interactive means for transmitting to an originator of said incoming call a verbal message requesting entry of an authorization code, for receiving the entered code and for allowing said incoming call to be completed if the entered code compares with a code contained in said record.

11. The network set forth in claim 7 wherein said communications path is associated with common channel signaling.

12. The network set forth in claim 7 wherein said calling information is a called telephone number.

13. A network comprising a plurality of interconnected switches for establishing connections between individual ones of said switches to forward respective incoming calls to their intended destinations, said switches exchanging messages with one another via a communications path in order to establish said connections, said incoming calls being associated with respective services, said network comprising means for interfacing associated ones of said switches with said communications path, and wherein said means for interfacing includes, means for receiving messages via said communications path and then supplying said messages to an associated one of said switches, and further includes means, operative whenever one of said received messages is associated with an incoming call that is received at the associated one of said switches, for identifying, as a function of calling information contained in said message, a service logic that will be used to process said incoming call, for appending the identity of said service logic to said one message and supplying said one message to the associated one of said switches, wherein said calling information includes an automatic identification code identifying the source of said incoming call, said identification code including an area code, exchange code and a circuit code, and wherein said means for identifying includes means for translating said area, exchange and circuit codes into a memory location having stored therein said identity of said service logic.

14. The network set forth in claim 13 wherein said means for identifying includes means, operative in the event that said memory location does not contain the identity of said service logic, for then supplying a null word to said one switch as the identity of said service logic.

15. A method of processing an incoming call in a telecommunications system formed from a plurality of switches interconnected to one another, said incoming call being associated with a respective calling service provided by said system, said method comprising the steps of interfacing at least one of said switches with a data network such that said one of said switches may communicate with other ones of said switches to forward said incoming call to an intended destination, intercepting a message sent to said one of said switches via said data network, in which said message contains information relating to said incoming call, and identifying the service associated with said incoming call as a function of said information, appending to said intercepted message an identifier identifying a service logic that is to process said call and for then passing said message to said one of said switches so that said one of said switches my process said call in accord with the identified service logic.

16. The method set forth in claim 15 wherein said intercepted message is an initial address message.

17. The network set forth in claim 15 wherein said data network is a data network which uses common channel signaling.

18. A method of processing an incoming call in a telecommunications system formed from a plurality of switches interconnected to one another, said incoming call being associated with a respective calling service provided by said system, said method comprising the steps of interfacing an associated one of said switches with a data network such that said one switch may communicate with other ones of said switches to forward said incoming call to an intended destination, intercepting a message sent to said one of said switches via said data network, in which said message contains information relating to said incoming call, and identifying the service associated with said incoming call as a function of said information, appending to said intercepted message an identifier identifying a service logic that is to process said call and for then passing said message to said one switch so that said call may be processed in accord with the identified service logic, wherein said calling information is a telephone number associated with the originator of said call, and wherein said step of identifying includes the step of translating said telephone number into a memory location at which is stored a record identifying said service logic.

19. A method of processing an incoming call in a telecommunications system formed from a plurality of switches interconnected to one another, said incoming call being associated with a respective calling service provided by said system, said method comprising the steps of

- interfacing an associated one of said switches with a data network such that said one switch may communicate with other ones of said switches to forward said incoming call to an intended destination,
- intercepting a message sent to said one of said switches via said data network, in which said message contains information relating to said incoming call, and
- identifying the service associated with said incoming call as a function of said information, appending to said intercepted message an identifier identifying a service logic that is to process said call and for then passing said message to said one switch so that said call may be processed in accord with the identified service logic, wherein said calling information includes an automatic identification code identifying the source of said incoming call, said identification code including an area code, exchange code and a circuit code, and wherein said step of identifying includes the step of translating said area, exchange and circuit codes into a memory location having stored therein said identity of said service logic.

20. The network set forth in claim 19 wherein said step of identifying includes the step of supplying a null word to said one switch as the identity of said service logic when the contents of said memory location does not identify said service logic.

* * * * *